(12) United States Patent
Endo et al.

(10) Patent No.: US 8,243,745 B2
(45) Date of Patent: Aug. 14, 2012

(54) BUFFER MANAGEMENT METHOD AND PACKET COMMUNICATION APPARATUS

(75) Inventors: Hideki Endo, Kawasaki (JP); Akihiko Tanaka, Yokohama (JP); Takayuki Kanno, Yokohama (JP); Masayuki Takase, Fujisawa (JP); Taisuke Ueta, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 12/699,221

(22) Filed: Feb. 3, 2010

(65) Prior Publication Data

US 2010/0220743 A1    Sep. 2, 2010

(30) Foreign Application Priority Data

Feb. 27, 2009  (JP) .................................. 2009-045876

(51) Int. Cl.
*H04L 12/56* (2006.01)
*G06F 3/00* (2006.01)

(52) U.S. Cl. ......................................... 370/412; 710/52

(58) Field of Classification Search .................. 370/412, 370/413; 710/52, 56
See application file for complete search history.

(56) References Cited

FOREIGN PATENT DOCUMENTS

| JP | 7-221762 A | 8/1995 |
|---|---|---|
| JP | 10-32581 A | 2/1998 |

*Primary Examiner* — Dang Ton
*Assistant Examiner* — Kevin Lee
(74) *Attorney, Agent, or Firm* — Mattingly & Malur, PC

(57) ABSTRACT

A packet communication apparatus includes a frame buffer of a linked list method and holds chain information and buffer size information, for structuring a linked list buffer for each user flow, in two areas consisting of an operation area and an update area. While usually in service, the buffer is structured by using the chain information in the operation area and the buffer size information in the same area such that the frame is read/written in the frame buffer. When the chain information in the update area and the buffer size information in the same area have been changed, a queue size is changed by reflecting the updated chain information and the updater buffer size information into the operation area, when both the read pointer and the write pointer respectively have gone around the buffer, or when there is no frame stored in the buffer.

15 Claims, 18 Drawing Sheets

FIG. 5

| VLAN ID | TAG PROCESSING | NEW VLAN ID | CoS PROCESSING | NEW CoS | OUTPUT NIF ID | FLOW ID | SOURCE MAC ADDRESS | DESTINATION MAC ADDRESS |
|---|---|---|---|---|---|---|---|---|
| VID#1 | TRANSLATION | VID#A | TRANSLATION | CoS#0 | NIF#5 | FLOW ID#1 | MAC#10N05 | MAC#10A |
| VID#2 | ADDITION | VID#B | COPYING | CoS#5 | NIF#1 | FLOW ID#2 | MAC#10N01 | MAC#10C |
| | ...... | ...... | ...... | ...... | ...... | ...... | ...... | |
| 2101 | 2102 | 2103 | 2104 | 2105 | 2106 | 2107 | 2108 | 2109 |

| FLOW ID | HEAD BANK ADDRESS | A/D | OPERATION QUEUE SIZE | UPDATE QUEUE SIZE | STORAGE BYTE NUMBER | WRITE POINTER | READ POINTER | WP CIRCLING FLAG | RP CIRCLING FLAG | QUEUE SIZE CHANGE COMPLETION FLAG |
|---|---|---|---|---|---|---|---|---|---|---|
| FLOW ID#1 | TBA#1 | 0 | 10 | 10 | 18344 | WP#1 | RP#1 | 1 | 1 | 1 |
| FLOW ID#2 | TBA#1 | 0 | 3 | 3 | 1267 | WP#2 | RP#2 | 1 | 1 | 1 |
| ...... | ...... | ...... | ...... | ...... | ...... | ...... | ...... | ...... | ...... | ...... |
| 2301 | 2302 | 2303 | 2304 | 2305 | 2306 | 2307 | 2308 | 2309 | 2310 | 2311 |

| BANK ADDRESS | OPERATION NEXT BANK ADDRESS | UPDATE NEXT BANK ADDRESS |
|---|---|---|
| BA#0 | OPERATION NEXT BANK ADDRESS #0 | UPDATE NEXT BANK ADDRESS #0 |
| BA#1 | OPERATION NEXT BANK ADDRESS #1 | UPDATE NEXT BANK ADDRESS #1 |
| ...... | ...... | ...... |

| FLOW ID | HEAD BANK ADDRESS | A/D | OPERATION QUEUE SIZE | UPDATE QUEUE SIZE | STORAGE BYTE NUMBER | WRITE POINTER | READ POINTER | WP CIRCLING COUNTER | RP CIRCLING COUNTER | INVALIDATION FLAG | QUEUE SIZE CHANGE COMPLETION FLAG |
|---|---|---|---|---|---|---|---|---|---|---|---|
| FLOW ID#1 | TBA#1 | 0 | 10 | 10 | 18344 | WP#1 | RP#1 | 2 | 2 | 1 | 1 |
| FLOW ID#2 | TBA#1 | 0 | 3 | 3 | 1267 | WP#2 | RP#2 | 2 | 2 | 1 | 1 |
| ...... | ...... | ...... | ...... | ...... | ...... | ...... | ...... | ...... | ...... | ...... | ...... |

| BANK ADDRESS | IN-USE FLAG | OPERATION NEXT BANK ADDRESS | UPDATE NEXT BANK ADDRESS |
|---|---|---|---|
| BA#0 | 1 | OPERATION NEXT BANK ADDRESS #0 | UPDATE NEXT BANK ADDRESS #0 |
| BA#1 | 1 | OPERATION NEXT BANK ADDRESS #1 | UPDATE NEXT BANK ADDRESS #1 |
| ...... | ...... | ...... | ...... |
| 2401 | 2404 | 2402 | 2403 |

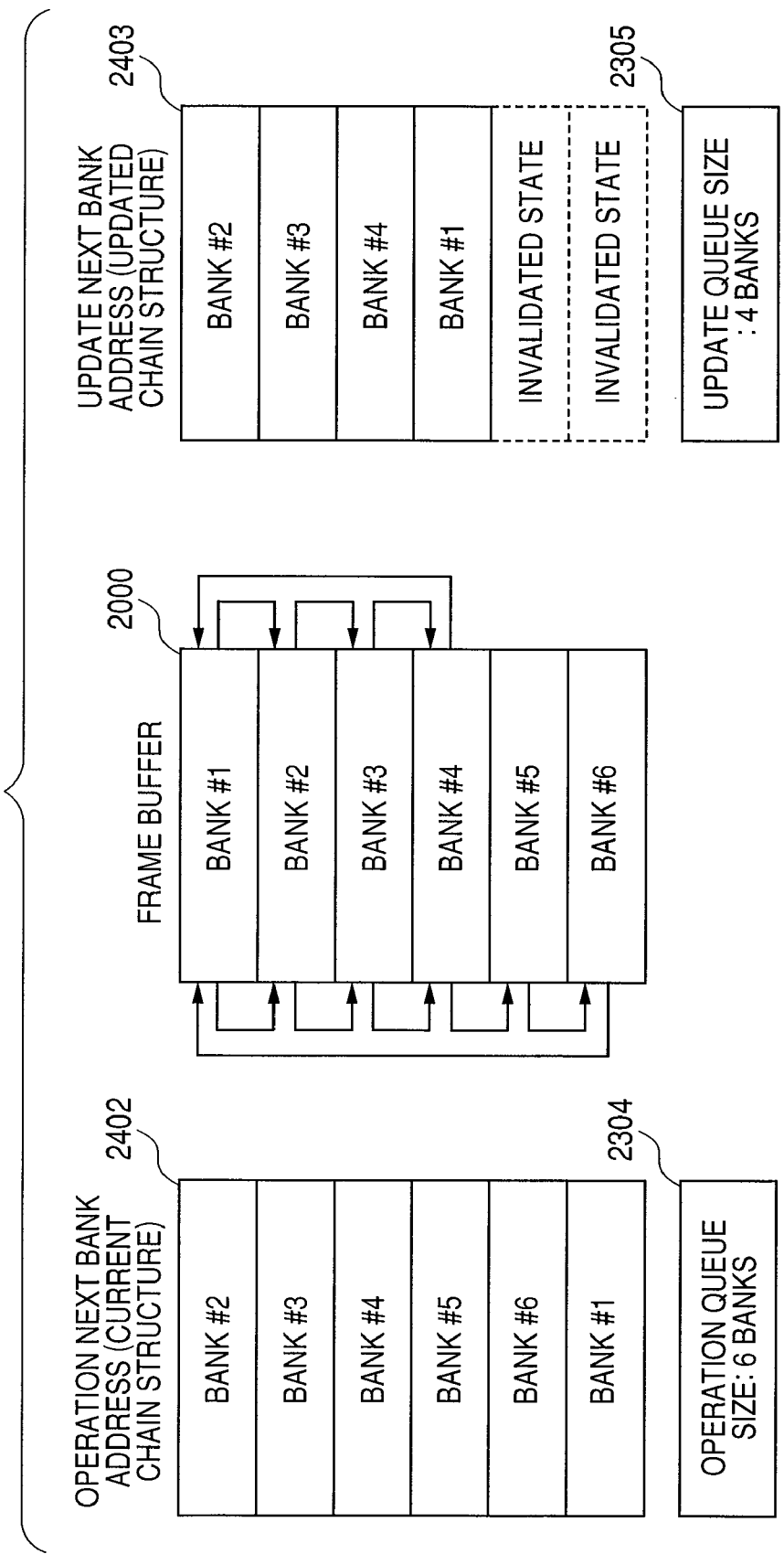

BUFFER MANAGEMENT METHOD AND PACKET COMMUNICATION APPARATUS

CLAIM OF PRIORITY

The present application claims priority from Japanese patent application JP 2009-045876 filed on Feb. 27, 2009, the content of which is hereby incorporated by reference into this application.

FIELD OF THE INVENTION

The present invention relates to a packet communication apparatus, and in particular, to a buffer management technique in which a queue size of a buffer for temporarily holding packets or frames can be dynamically changed.

BACKGROUND OF THE INVENTION

In recent years, with the progress of digitization of television program contents and the spread of distribution services of motion pictures on the Internet, there is an increasing demand that a large volume of data be communicated on a network. Accordingly, the Ethernet (registered trademark and the same shall apply hereinafter) is widely used in which high-speed communication can be realized inexpensively. In transmitting a large volume of user data, such as IP (Internet Protocol) packets, a plurality of frames are transmitted continuously (in a bursty manner) in the Ethernet. In a network in which such bursty traffics are multiplexed, frame discard occurs because data exceeding the wire rate are sometimes inputted. Accordingly, in order to ensure QoS (Quality of Service), it is necessary to reduce degree of burst by performing peak rate shaping at the entrance of a network. In this case, because a frame for each user flow is transmitted, in the shaper, at a timing of a frame interval in accordance with the set bandwidth, it is required that the frame is stored in the buffer for every user flow. To realize this, two methods are generally known: one is a method in which a physical buffer is shared by a plurality of users (shared buffer method: JP-A-Hei10 (1998)-32581); and the other is a method in which a physical buffer is virtually divided to be allocated to each flow (linked list method: JP-A-Hei07 (1995)-221762).

SUMMARY OF THE INVENTION

However, when the shared buffer method is used, the occupied amount of a buffer is to be proportional to the input bandwidth to the shaper. Therefore, when there is a user flow whose input bandwidth to the shaper is extremely large, most of the buffer is to be occupied by the user, although the output bandwidth of the shape is set to be low, causing the problem that fairness of the QoS cannot be ensured among users.

On the other hand, when the linked list method is used, it is the simplest way for a physical buffer to be equally divided to allocate to each flow. However, because the burst length of a traffic may be possibly longer as the input bandwidth to the shaper is higher, a large buffer amount, necessary when the input bandwidth may be highest as the worst case, has to be allocated to all flows in order to ensure the QoS for all user flows. Accordingly, in the case of the shaper for storing hundreds to thousands of users, a huge buffer amount will be needed.

Therefore, it can be considered that a buffer amount in accordance with the reservation bandwidth of each flow is allocated before starting operation. However, the number of users or the bandwidth to be stored are frequently changed after operation has started, it is preferable that the buffer amount to be allocated to each user flow, can be changed while in service (during the conduction of frame). In the linked list method, however, when a buffer chain have been changed during the conduction of frame, there is a problem as follows: at first, when the buffer has been increased, a frame may be possibly read out from the increased empty area, possibly causing an incorrect frame to be transmitted; and, when the buffer has been reduced, a write pointer or a read pointer, if present in the reduced area, may indicate an incorrect area after the reduction of the buffer, and therefore a normal operation cannot be ensured.

An object of the present invention is to provide a buffer management method and a packet communication apparatus in which, even when a buffer amount has been changed in the linked list method, a frame is not read out from an empty area and buffer management can be performed in a normal operation.

To achieve the aforementioned object, the present invention relates to a buffer management method in a packet communication apparatus having a linked list buffer. The packet communication apparatus holds chain information and buffer size information, for structuring a linked list buffer for each user flow, in two areas consisting of an operation area and an update area, and holds go-around information indicating that a write pointer and a read pointer, for reading/writing in the linked list buffer, have gone around the linked list buffer. While usually in service, the linked list buffer is structured by using the chain information in the operation area and the buffer size information in the same area such that a frame for a user flow is read/written in the linked list buffer, and when the chain information in the update area and the buffer size information in the same area have been changed, the queue size is changed by reflecting the updated chain information in the update area and the updated buffer size information in the same area into the operation area when each of the read pointer and the write pointer indicates that the linked list buffer has been circled. Such a buffer management method and an apparatus for realizing the method are provided by the present invention.

In the packet communication apparatus, a queue size is updated by reflecting the updated chain information in the update area and the updated buffer size information in the same area into the operation area when there is no frame stored in the linked list buffer. Further, in the packet communication apparatus, when the chain information in the update area and the buffer size information in the same area have been changed, update processing of the chain information or invalidation processing of the eliminated buffer area in the liked list buffer is performed based on the number of the go-around indicated by the go-around information.

That is, to realize the aforementioned object, a shaper in the packet communication apparatus according to the present invention has a buffer of a linked list method and holds chain information and buffer size information, for structuring a linked list buffer for each user flow, in two areas consisting of an operation area and an update area, and holds a flag indicating that a pointer for reading/writing in the buffer have gone around the buffer. While usually in service, the buffer is structured by using the chain information in the operation area and the buffer size information in the same area such that a frame for each user flow is read/written in the buffer, and when the chain information in the update area and the buffer size information in the same area have been changed, the queue size can be dynamically changed by making the updated chain information in the update area and the updated buffer size information in the same area be the relevant information in the operation area when both the read pointer and the write pointer have gone around the buffer, respectively, or when there is no frame stored in the buffer.

According to the present invention, when it is necessary to store, in a buffer, a frame for each of a plurality of user flows, such as peak rate shaping for a plurality of users, a buffer size, necessary for each user, can be changed without disposing a frame even during the conduction of the frame, and hence the services in which the QoS, which is demanded by users, frequently varies can be flexibly dealt with.

BRIEF DESCRIPTION OF THE DRAWINGS

FIG. 5 is a view illustrating a header processing table with which the input header processing unit in FIG. 2 is provided;

FIG. 7 is a view illustrating a queue management table with which the output frame buffer control unit in FIG. 2 is provided;

FIG. 8 is a view illustrating a chain table with which the output frame buffer control unit in FIG. 2 is provided;

FIG. 15 is a view illustrating an example of the queue management table with which the output frame buffer control unit in FIG. 2, according to a second embodiment;

FIG. 16 is a view illustrating an example of the chain table with which the output frame buffer control unit in FIG. 2 is provided, according to the second embodiment;

FIG. 19 is a view illustrating an example of the outline of the reduction in the linked list buffer, according to the second embodiment.

DETAILED DESCRIPTION OF THE PREFERRED EMBODIMENTS

Hereinafter, preferred embodiments of the present invention will be described with reference to the accompanying drawings. At first, a linked list buffer, which is a premise of the present invention, will be described with reference to FIG. 1.

Figure 1:
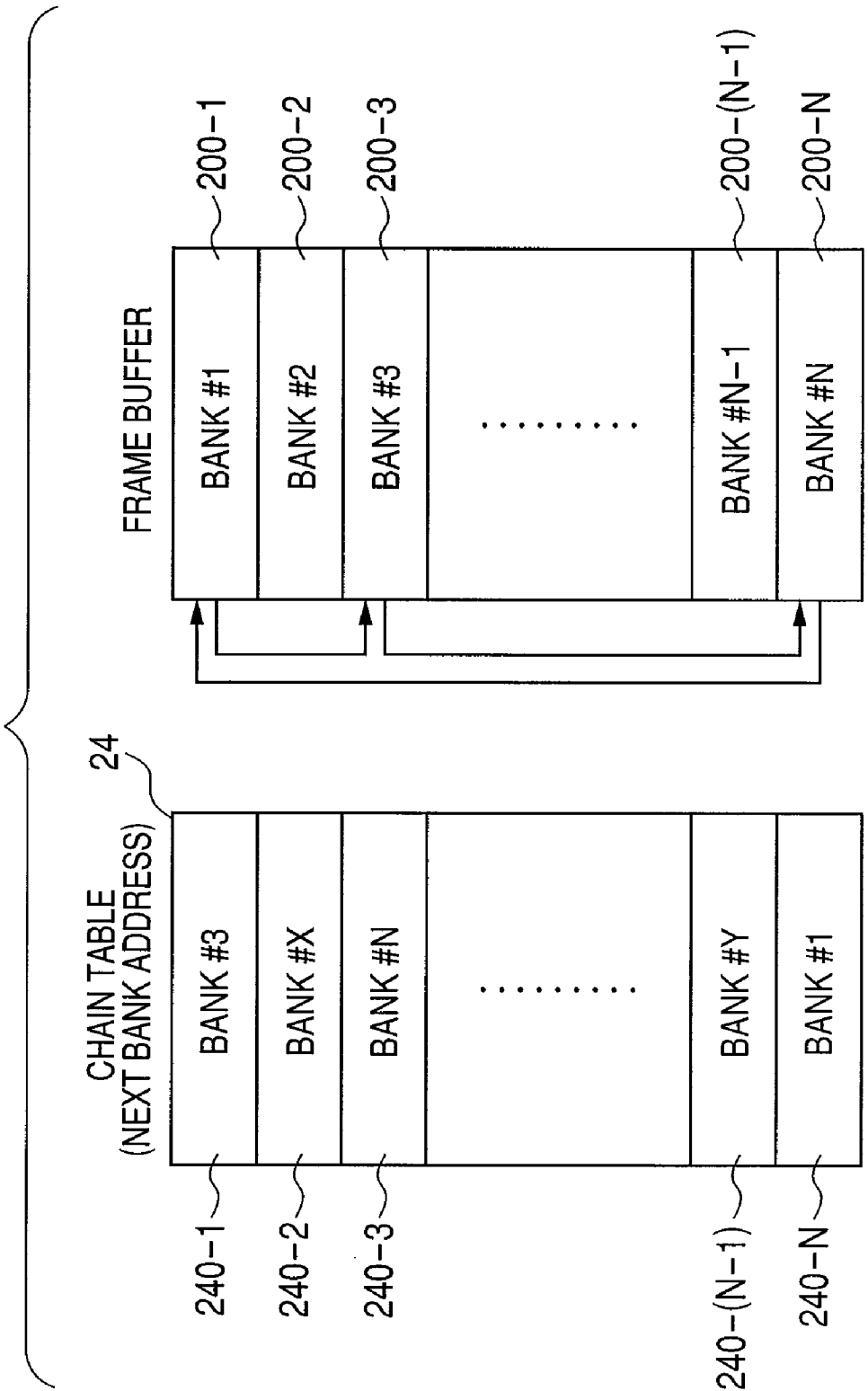
FIG. 1 is a schematic block view of a packet forwarding apparatus having a linked list buffer.

As illustrated in FIG. 1, in the linked list buffer, a physical frame buffer is divided into banks 200, each having a constant capacity, so that a chain table 24 is present, corresponding to each bank address. The chain table 24 stores next bank addresses 240, to each of which each bank 200 is connected. By tracing the next bank addresses 240, access to the linked list buffer can be possible. FIG. 1 illustrates an example in which the linked list buffer has been structured by using the bank #1: 200-1 of the frame buffer, the bank #3: 200-3 thereof, and the bank #N: 200-N thereof. Because the bank #3: 200-3 is set in the next bank address 240-1 in the chain table 24, the next bank address 240-1 corresponding to the bank #1: 200-1, access to the bank #3: 200-3 can be possible. Further, because the bank #N: 200-N is set in the next bank address 240-3 corresponding to the bank #3: 200-3, and because the bank #1: 200-1 is set in the next bank address 240-N corresponding to the bank #N: 200-N, it can be understood that the linked list buffer is structured by the chain being circled. The present invention is to provide a buffer management technique in which the number of the banks 200 (queue size) can be increased or reduced even during the conduction of the frame (during operation).

First Embodiment

The outline of a first embodiment in which the queue size is changed during the conduction of the frame (during operation) will be described with reference to FIGS. 13 and 14.

In the buffer management technique according to the present embodiment, a next bank address indicating a chain information structure for each bank in the frame buffer 2000, is held in two areas consisting of an operation next bank address 2402 and an update next ban address 2403. A queue size is also held in two areas consisting of an operation queue size 2304 and an update queue size 2305. Buffer management while usually in service is performed by using the operation next bank address 2402 and the operation queue size 2304. When one intends to change the queue size, the update next bank address 2403 and the update queue size 2305 will be changed.

Figure 13:
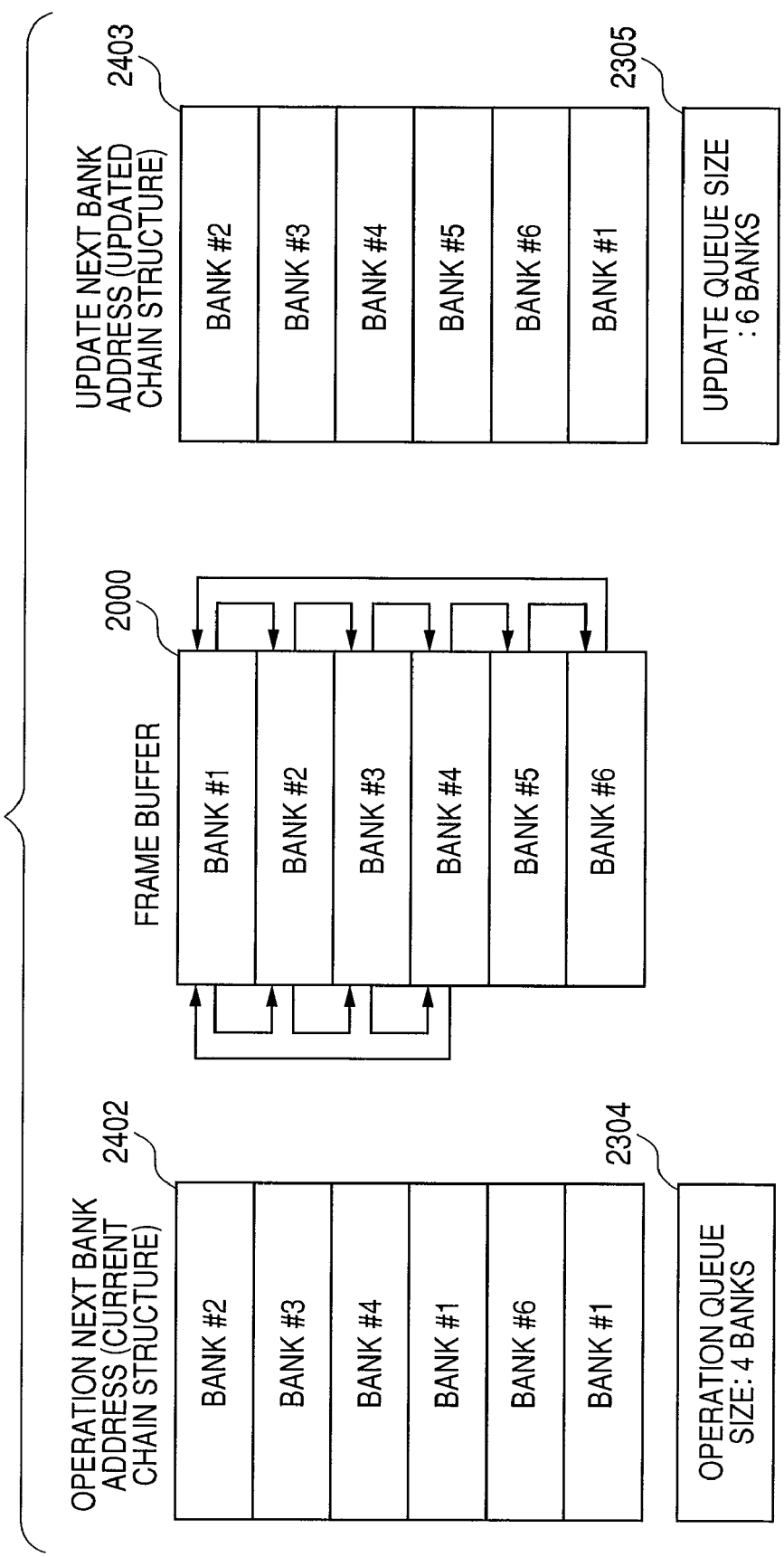
FIG. 13 is a view illustrating an example of the outline of increase in the linked list buffer according to the first embodiment.

FIG. 13 is a view illustrating the outline of an increase in the queue size indicating the number of the banks in the frame buffer 2000. The operation queue size 2304 is four before increased, and a chain structure in which the four banks are connected is held as the operation next bank address 2402. In contrast, the update queue size 2305 is set to six and the chain structure thereof is rewritten as shown in the update next bank address 2403.

Figure 14:
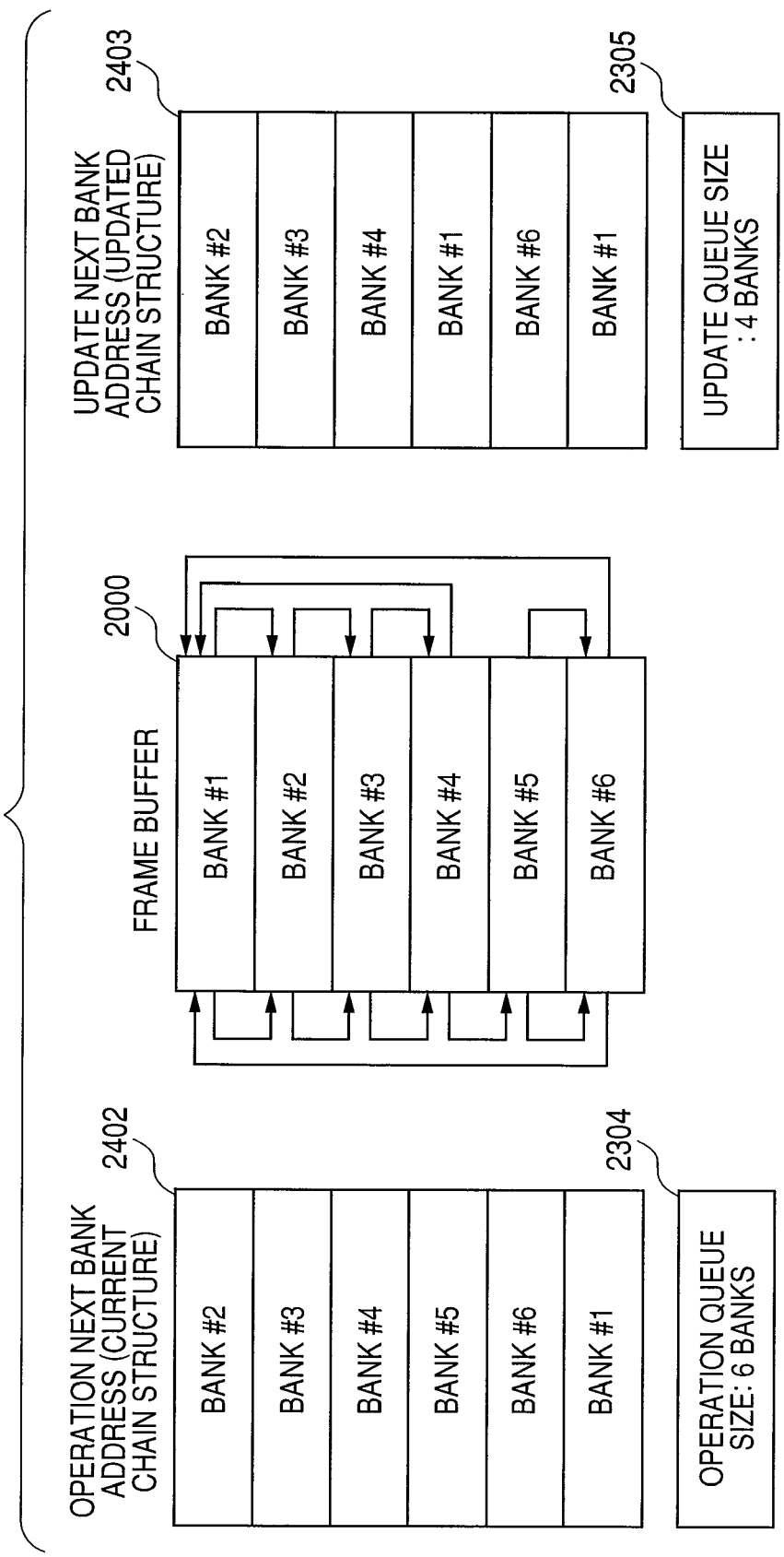
FIG. 14 is a view illustrating an example of the outline of reduction in the linked list buffer according to the first embodiment.

On the other hand, FIG. 14 is a view illustrating the outline of a reduction in the queue size indicating the number of the banks in the frame buffer 2000. The queue size 2304 is six before reduced, and a chain structure in which the six banks are connected is held as the operation next bank address 2402. In contrast, the update queue size 2305 is set to four and the chain structure thereof is rewritten as shown in the update next bank address 2403.

In the states illustrated in FIGS. 13 and 14, the update processing of the queue size is started by providing a trigger for starting change in the queue size (by setting a queue size change completion flag 2311, a WP (Write Pointer) go-around flag 2309, and an RP (Read Pointer) go-around flag 2310, which will be described later, are set to '0'). When the fact that the write pointer and the read pointer have both circled the buffer (have returned to the head of the buffer 2000) is detected, the update next bank address 2403 is copied to the operation next bank address 2402, and the update queue size 2305 is copied to the operation queue size 2304. When the fact that these copy processing has completed (the second go-around has occurred with the read pointer) is detected, the increase processing of the queue size is completed ('1' is set in the queue size change completion flag 2311). However, when there is no frame present in the buffer 2000 as a result of reading out a frame from the buffer 2000, the queue size can be immediately changed without waiting for the go-around by the write pointer and the read pointer, and hence it is necessary to initialize each pointer in the head of the buffer. If the queue size is updated only by the go-around by each pointer without this function, change in the queue size will not be completed when no frame is involved in the processing.

As stated above, according to the present embodiment, the queue size during operation can be changed by holding, in two areas, the chain information in the buffer 2000 and the queue size, and by using a go-around situation by the write pointer and the read pointer.

Figure 2:
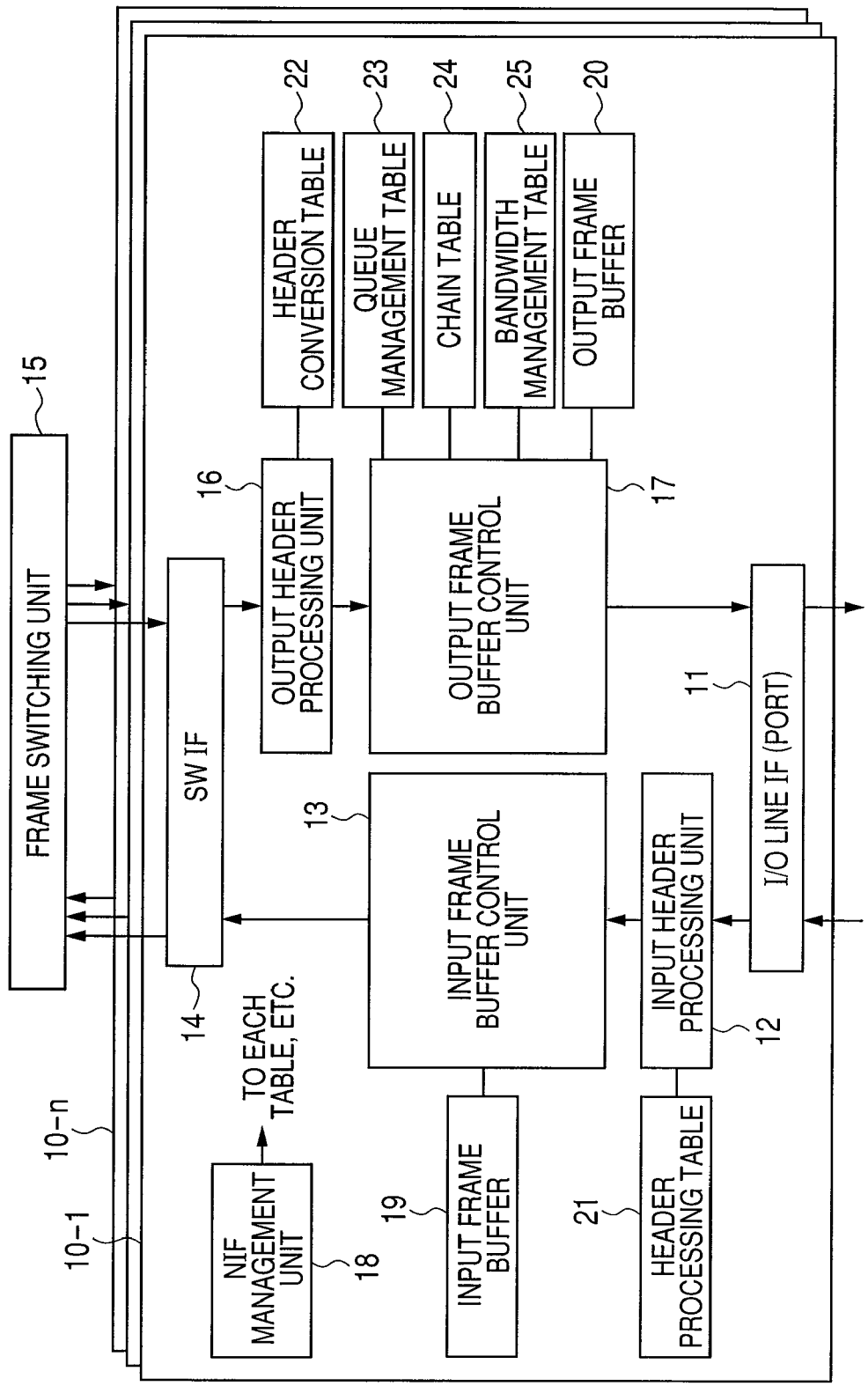
FIG. 2 a schematic block, view of the packet forwarding apparatus according to a first embodiment.

FIG. 2 is a block view illustrating a structure example of a packet forwarding apparatus 10N, a packet communication apparatus according to the present embodiment.

The packet forwarding apparatus 10N is composed of a plurality of network interface boards (NIFs) 10 (10-1 through 10-n) and a frame switching unit 15 connected to these NIFs.

Each NIF 10 is composed of a FPGA (Field Programmable Gate Array) and a dedicated ASIC (Application Specific Integrated Circuit), etc., and comprises an I/O (input/output) line interface 11 used as a communication port, a CPU (Central Processing Unit) functioning as a processing unit or a control unit, and a memory used as a storage unit for storing a table and the like. The NIF 10 is connected to another packet communication apparatus via the communication port. In the present embodiment, the I/O line interface 11 is used as a line interface for the Ethernet.

Each NIF 10 functioning as a user access device includes an input header processing unit 12 connected to its I/O line interfaces 11, and an input frame buffer control unit 13 connected to the input header processing unit 12. Also, each NIF 10 includes an SW interface 14 connected to the frame switching unit 15, an output frame header processing unit 16 connected to the SW interface, and an output frame buffer control unit 17 connected to the output frame header processing unit 16. Further, the NIF 10 includes an NIF management unit 18 for managing and setting the whole blocks of the NIF and tables. Because these processing units, control units, and management unit are realized by the program processing in the aforementioned CPU, the CPU by which these processing functions can be realized will be hereinafter collectively referred to a "processing unit". Various processing functions will be described mainly by using flow charts illustrating the program processing in the processing unit. It is needless to say that these processing programs are stored, in advance, in the memory, the non-illustrated storage unit, or are installed by using a network, if necessary.

Figure 3:
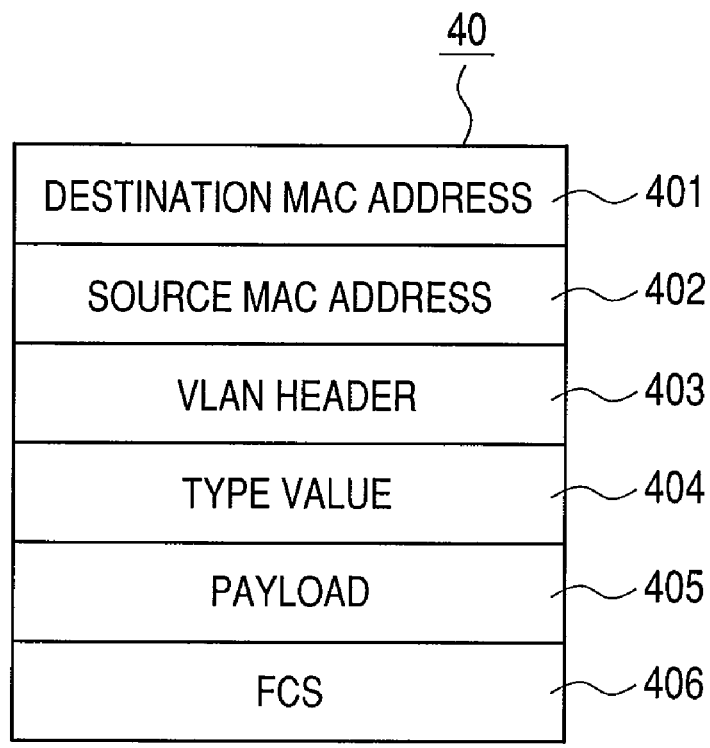
FIG. 3 is a view illustrating a format of a communication frame transmitted over a communications system according to the first embodiment.
Figure 4:
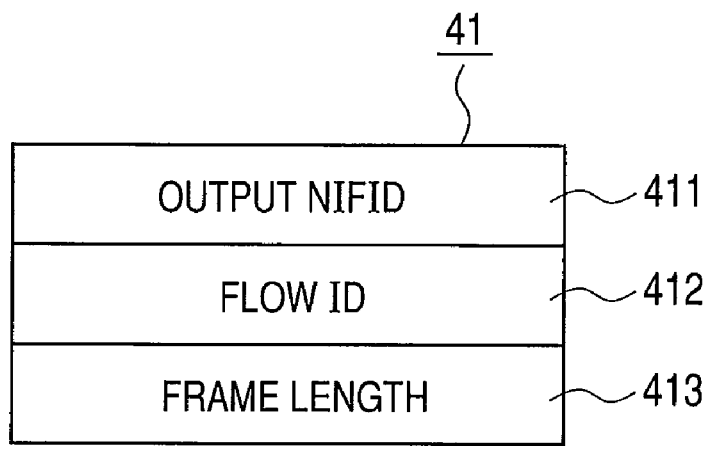
FIG. 4 is a view illustrating the format of a frame information header to be added in an input frame of an NIF device, a user access device, according to the first embodiment.

When receiving a communication frame 40 illustrated in FIG. 3 from an input line, the I/O line interface 11 adds a frame information header 41 illustrated in FIG. 4.

The communication frame 40 is composed of a destination MAC address 401, a source MAC address 402, a VLAN tag 403, an MAC header consisting of a type value 404 indicating the type of the subsequent header, a payload 405, and a frame check sequence (FCS) 406.

The MAC address of the packet forwarding apparatus 10A or 10N, or a terminal 70, is set in the destination MAC address 401 and the source MAC Address 402. The VLAN tag 403 indicates the value of the VLAN ID (VID), used as a flow identifier.

The frame information header 41 is composed of a plurality of fields indicating an output network interface board identifier (NIF ID) 411, a flow ID 412, and a frame length 413. Among them, the NIF ID 411 functions as internal routing information, and the frame switching unit 15 forwards an input frame to the specific SW interface of the specific network interface board in accordance with the internal routing information.

When the I/O line interface 11 adds the frame information header 41 to the receiving frame, the output NIF ID 411 and the flow ID 412 are empty. Effective values are set in these fields by the input header processing unit 12.

The input header processing unit 12 adds the values of the NIF ID 411 and the flow ID 412 to the frame information header 41 of each input frame with reference to a header processing table 21.

FIG. 5 is a structural view illustrating an example of the header processing table 21.

The header processing table 21 is one set by the NIF management unit 18, and is used for retrieving, with a VLAN ID 2101 being a retrieval key, the table entry indicating tag processing 2102, a new VLAN ID 2103, CoS (Class of Service) processing 2104, a new CoS 2105, an output NIF ID 2106, a flow ID 2107, a source MAC address 2108, and a destination MAC address 2109. Herein, the tag processing 2102 indicates a method of processing the VLAN tag, such as no processing, translation, addition, and deletion, and the new VLAN ID 2103 sets a new VLAN ID to be written in the VLAN tag when the tag processing 2102 is set to the translation or addition. The CoS processing 2104 indicates a method of processing the CoS in the VLAN tag, such as translation and copying, the new CoS 2105 sets a new CoS to be written in the VLAN tag when the CoS processing 2104 is set to the translation. The source MAC address 2108 is one held by the I/O line interface 11, and the destination MAC address 2109 indicates the MAC address of the packet forwarding apparatus, which is to be the address of the frame connected via the aforementioned I/O line interface 11.

When receiving the frame, the input header processing unit 12 retrieves, from a header processing table 21, the table entry corresponding to the value of the VID (VID #) indicated by the VLAN tag 403 in the input frame, so that the VLAN tag processing is performed in accordance with the tag processing 2102 and the CoS processing 2105 indicated by the table entry, and the head processing of the input frame 40 is performed by applying the source MAC address 2108 and the destination MAC address 2109. Further, the input header processing unit 12 overwrites the values of the output NIF ID 2106 and the flow ID 2107, indicated by the aforementioned table entry, into the frame information header 41 such that the input frame is forwarded to the input frame buffer control unit 13.

When receiving the frame from the input header processing unit 12, the input frame buffer control unit 13 stores the frame in the input frame buffer 19. Further, the input frame buffer control unit 13 reads out the frame accumulated in the input frame buffer 19 such that the frame is transmitted to an SW interface 12 after adjusting the gap between the frames.

The frame switching unit 15 receives the input frame from the SW interface 14 in each interface board (NIF), and transmits, as an output frame, the input frame to the SW interface 14 in the interface board (NIF) specified by the output NIF ID 411 indicated by the frame information header.

The output frames received by each SW interface 14 are sequentially supplied to the output header processing unit 16. In the present embodiment, although the format conversion from the input frame to the output frame is performed by the input header processing unit 12, the format conversion function may be executed by the output header processing unit 16 by providing a header conversion table 22, in which information necessary for the header conversation are stored, in the output header processing unit 16. When the header conversion has been performed by the input header processing unit 12, the output header processing unit 16 transmits the output frame, received from the SW interface 14, to the output frame buffer control unit 17 as it is.

The output frame buffer control unit 17 accumulates the output frame in the output frame buffer 20 for every flow. The output frame buffer control unit 17 reads out the accumulated output frame from the output frame buffer 20 while shaping the output frame by using the bandwidth information for every flow, set in a bandwidth management table 25, so that the read-out output frame is sent to the I/O line interface 11.

The I/O line interface 11 removes the frame information header 41 from the received output frame such that the output frame is sent to an output line in the format illustrated in FIG. 4 or 5.

Figure 6:
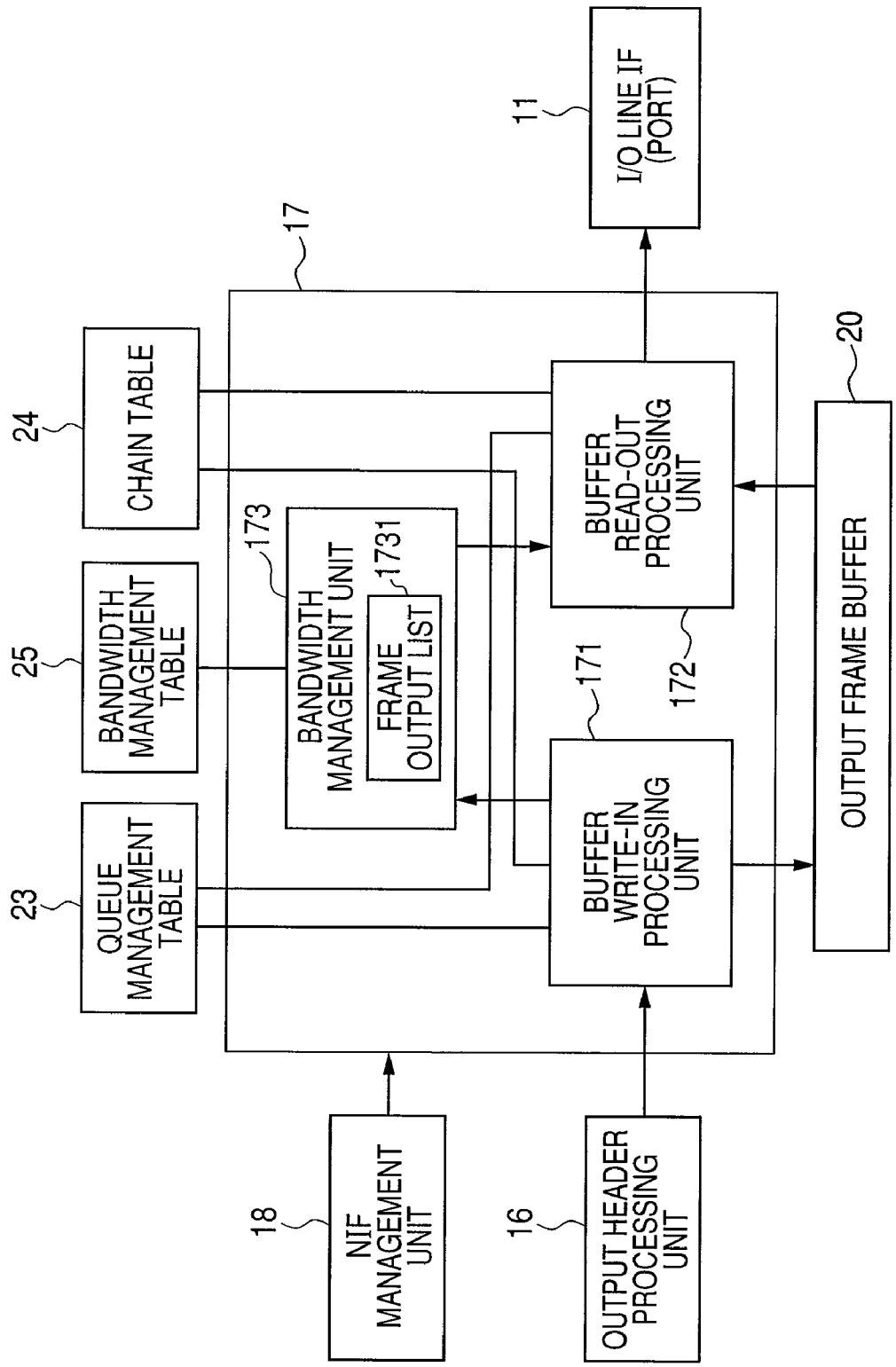
FIG. 6 is a block view illustrating a structure of the output frame buffer control unit in FIG. 2.

FIG. 6 is a functional block view illustrating an example of the output frame buffer control unit 17 in FIG. 2.

The output frame buffer control unit 17 is composed of a buffer write-in processing unit 171, a buffer read-out processing unit 172, and a bandwidth management unit 173; however, it is needless to say that these components can be realized by program processing of the aforementioned CPU, etc. Hereinafter, the present embodiment will be described based on the structure of the output frame buffer control unit, and the present structure can also be used in the structure of the input frame buffer control unit. It is needless to say that, in this case, the output header control unit 16 and the output frame buffer 20 can be appropriately changed to the input header processing unit 12 and the input frame buffer 19, etc.

When receiving the frame from the output header processing unit 16, the buffer write-in processing unit 171 in FIG. 6 performs buffer write-in processing, which will be described in detail later with reference to FIG. 9, so that the frame is stored in the buffer 20 and the flow ID 412 and the flow length 413, of the stored frame, and a frame storage notice are transmitted to the bandwidth management unit 173. When receiving this frame storage notice from the buffer write-in processing unit 171, the bandwidth management unit 173 searches the bandwidth management table 25 using the flow ID 412 to determine the read-out timing of the relevant frame, so that the flow ID 412 is stored in a frame output list 1731. The frame output list 1731 has a structure in which time and each entry correspond to each other in one-to-one manner, and thereby the read-out timing can be uniquely determined by which entry the flow-ID 412 has been stored in.

The bandwidth management unit 173 reads each entry of the frame output list 1731 at a constant interval to acquire the flow ID 104 if it is stored, and then notifies the buffer read-out processing unit 172 of the flow ID 412 along with a frame transmission request (herein, because the processing by the bandwidth management is not directly related to the present invention, detailed description thereof will be omitted). When receiving the aforementioned frame transmission request, the buffer read-out processing unit 172 performs frame transmission processing (S300), so that the frame is read out from the frame buffer 20 and outputted to the I/O line interface 11.

Figure 9:
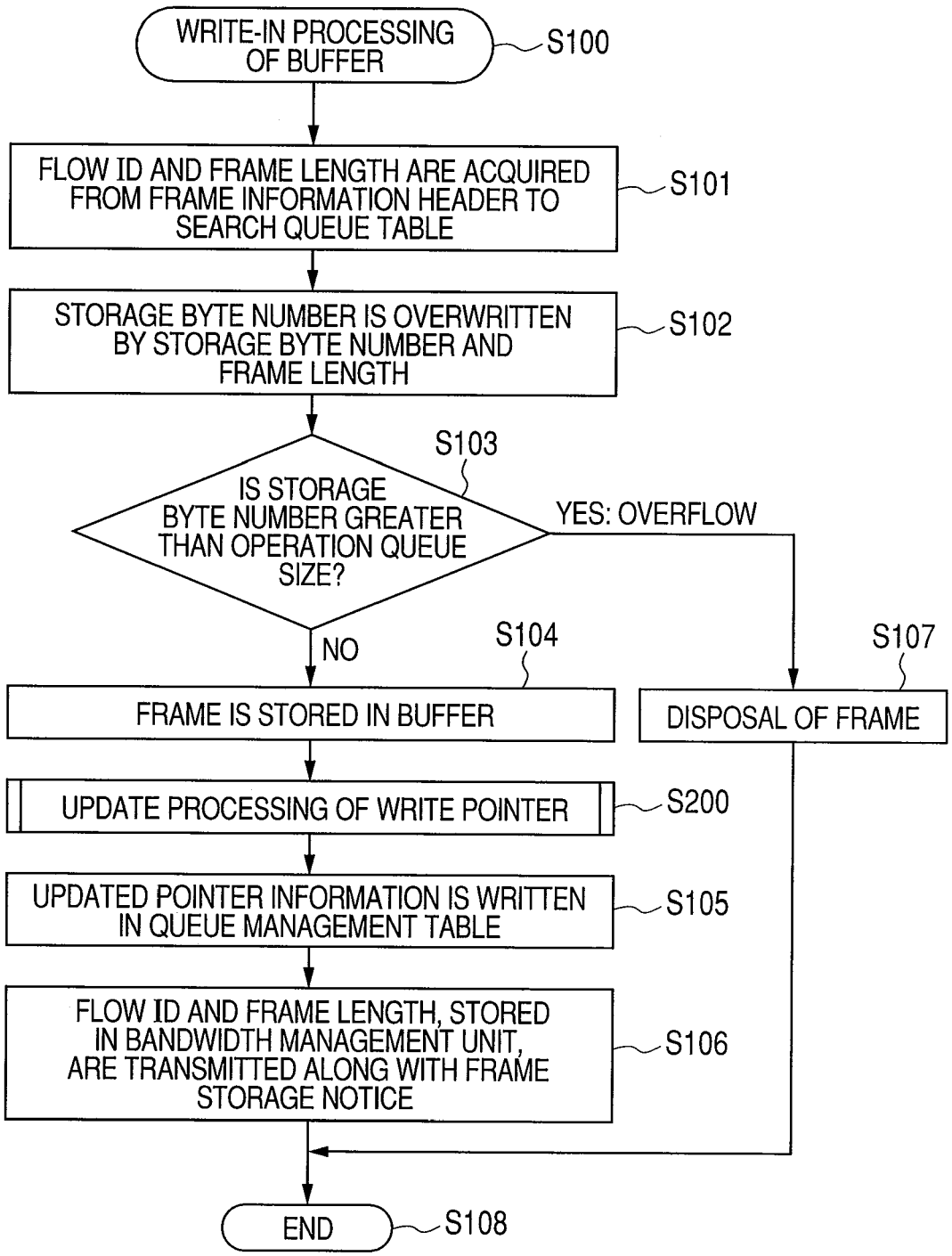
FIG. 9 is a flow chart of write-in processing of the buffer, executed by the output frame buffer control unit in FIG. 2.

FIG. 9 illustrates a flow chart of write-in processing of the buffer (S100), executed by the buffer write-in processing unit 171.

When receiving the frame from the output header processing unit 16, the buffer write-in processing unit 171 acquires the flow ID 412 and the frame length 413 from the frame information header 41 in the receiving frame to search a queue management table 23 (S101).

As one example is illustrated in FIG. 7, the queue management table 23 is one set by the NIF management unit 18 of the NIF 10, and is used for retrieving, with a flow ID 2301 being a retrieval key, the table entry indicating a head bank address 2302, an A/D 2303, the operation queue size 2304, the update queue size 2305, the storage byte number 2306, a write pointer 2307, a read pointer 2308, the WP go-around flag 2309, the RP go-around flag 2310, and the queue size change completion flag 2311. Herein, the head bank address 2302 indicates the address of the bank 200, which is to be the head of the linked list buffer in the relevant flow, and the A/D 2303 indicates an increase/reduction operation of the queue size during operation ('0': increase in buffer, '1': reduction in buffer), and the operation queue size 2304 indicates the queue size operated in the relevant flow, and the update queue size 2305 indicates the queue size after the operation queue size in the relevant flow has been changed, and the storage byte number 2306 indicates the number of bytes stored in the buffer in the relevant flow, and the write pointer 2307 indicates the write-start address of the buffer in the relevant flow, and the read pointer 2308 indicates the read-start address of the buffer in the relevant flow. Herein, the most significant X bit of the write pointer 2307 and the read pointer 2308 indicates the bank address of the relevant bank 200 whereas the least significant Y bit thereof indicates the address in the relevant bank 200. Further, the WP go-around flag 2309 is one indicating that the write pointer 2308 has returned to the head bank address of the buffer (has circled the buffer), whereas the RD go-around flag 2310 is one indicating that the read pointer 2309 has returned to the head bank address of the buffer (has circled the buffer). The queue size change completion flag 2311 indicates that change in the queue size during operation has been completed.

Referring back to FIG. 9, the buffer write-in processing unit 171 searches the queue management table 23. When acquiring the field information, the buffer write-in processing unit 171 overwrites the storage byte number 2306 by the storage byte number 2306 and the frame length 413 (S102), and compares whether the storage byte number 2306 is greater than the operation queue size 2304 (S103). When the storage byte number 2306 is greater than the operation queue size 2304, it causes a buffer overflow and thereafter the frame is disposed (S107) and the processing will end (S108). On the other hand, when the storage byte number 2306 is less than or equal to the operation queue size 2304 as a result of the comparison, the frame is stored in the buffer by using the write pointer 2307 (S104), and the update processing of the write pointer 2307 is performed (S200), so that the updated write pointer 2307 and the storage byte number 2306 are written into the queue management table 23 (S105). Thereafter, the flow ID 412 and the frame length 413 of the stored frame are transmitted to the bandwidth management unit 173 along with a frame storage notice (S106), and the processing will end (S108).

Figure 10:
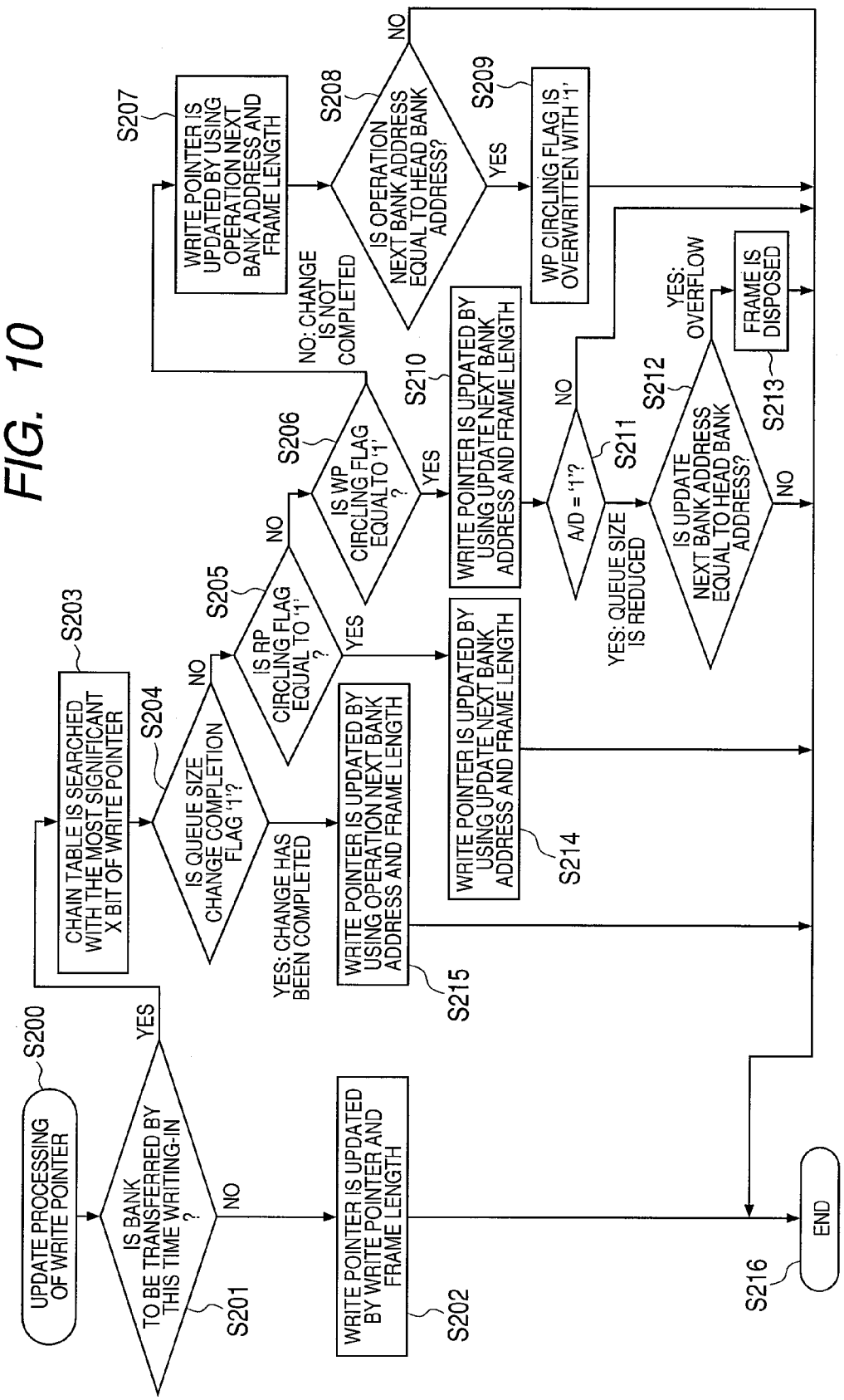
FIG. 10 is a flow chart of update processing of a write pointer, executed by the output frame buffer control unit in FIG. 2.

FIG. 10 illustrates an example of the update processing of the write pointer (S200) in FIG. 9. It is determined at first whether the bank is to be transferred as a result of this time writing-in for the frame length 413 (S201). When the bank is not to be transferred, the frame length 413 is added in the write pointer 2307 (S202) and the processing will end. On the other hand, when the bank is to be transferred as a result of the aforementioned determination, the chain table 24 is searched with the most significant X bit of the write pointer 2307 (S203).

The chain table 24 is one set by the NIF management unit 18, and is used for retrieving, with the bank address 2401 of the read pointer 2307 or of the most significant X bit of the read pointer 2308 being a retrieval key, the table entry indicating the operation next bank address 2402 and the update next bank address 2403. As illustrated in FIGS. 13 and 14, the operation next bank address 2402 indicates the next bank address to be the chain information during operation, whereas the update next bank address 2403 indicates the next bank address after the combination of the chains has been changed in the case of the queue size during operation being changed.

After searching the chain table 24 and acquiring the chain information, the buffer write-in processing unit 171 checks the queue size change completion flag 2311, which has been acquired from the queue management table 23 (S204). When the queue size change completion flag 2311 is '0' (the change is not completed), the RP go-around flag 2310 is checked (S205), and when the RP go-around flag is '0' (the go-around by the read pointer is not completed), the WP go-around flag 2309 is checked (S206). When the WP go-around flag is '0' (the go-around by the write pointer 2307 is not completed), the write pointer 2307 is updated by using the operation next bank address 2402 and the frame length 413 (S207). Thereafter, the operation next bank address 2402 is compared to the head bank address 2302 that has been acquired from the queue management table 23 (S208). When both are not equal to each other, the processing will end as it is (S216). On the other hand, when both are equal to each other in the S208, the WP go-around flag 2309 is overwritten with '1' (S209), and the processing will end (S216).

In the aforementioned S206, when the WP go-around flag 2309 is '1' (the go-around by the write pointer 2307 has been completed), the write pointer 2407 is updated by using the update next bank address 2403 and the frame length 413 (S210). Then, the A/D 2303 is checked and when the A/D 2303 is '0' (the queue size is increased), the processing will end (S216). On the other hand, when the aforementioned A/D 2303 is '1' (the queue size is reduced), the update next bank address 2403 is compared to the head bank address 2302 that has been acquired from the queue management table 23 (S212). When both are equal to each other, the frame is disposed as an overflow (S213) and the processing will end (S216). On the other hand, when both are not equal to each other in the S212, the processing will end as it is (S216).

In the aforementioned S205, when the RP go-around flag 2310 is '1' (the go-around by the read pointer has been completed), the write pointer 2407 is updated by using the update next bank address 2403 and the frame length 413 (S214), and the processing will end (S216).

In the aforementioned S204, when the queue size change completion flag 2311 is '1' (the change has been completed), the write pointer 2407 is updated by using the operation next bank address 2402 and the frame length 413 (S215), and the processing will end (S216).

Figure 11:
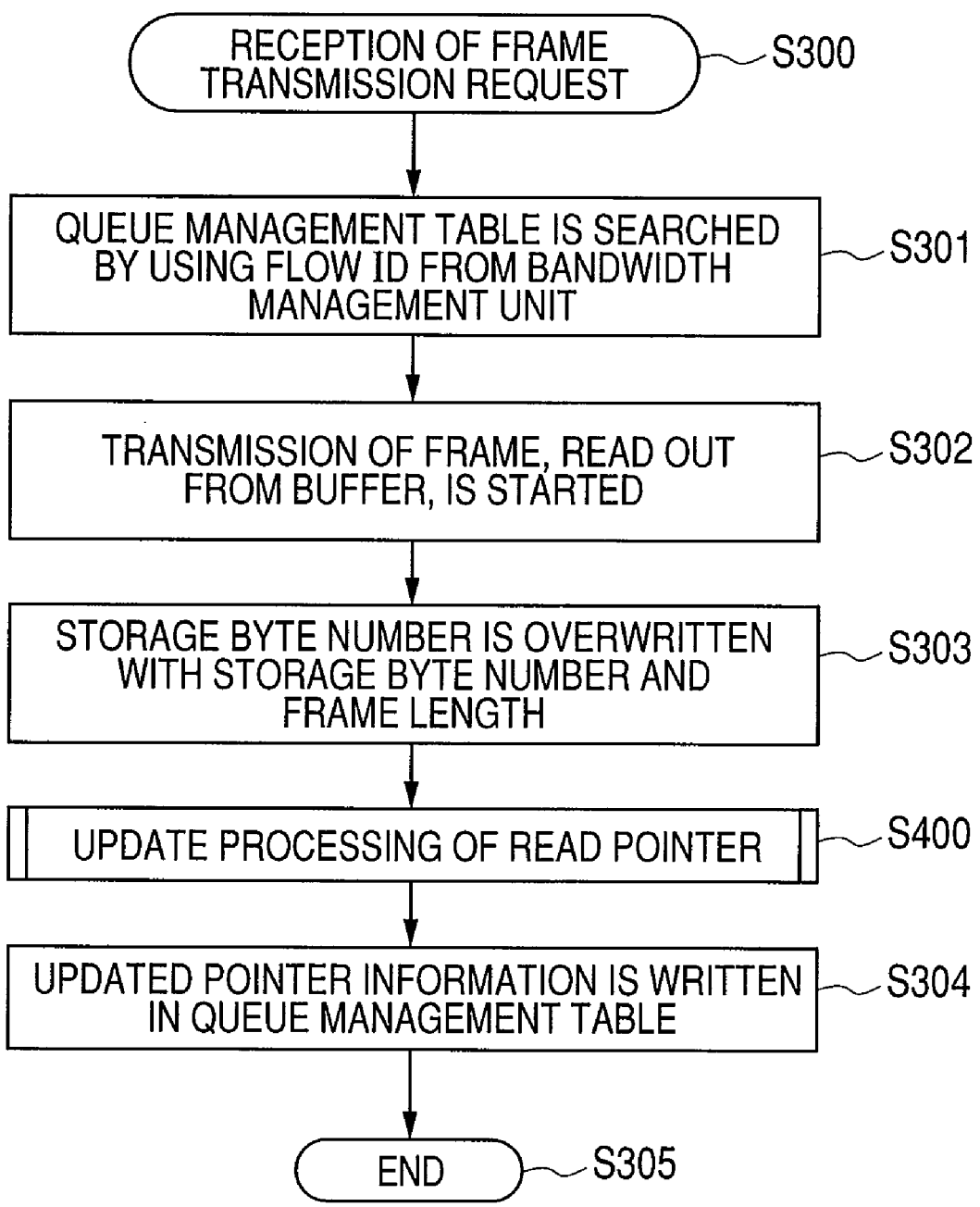
FIG. 11 is a flow chart of read-out processing of the buffer, executed by the output frame buffer control unit in FIG. 2.

FIG. 11 illustrates a flow chart of the read-out processing of the buffer (S300), executed by the buffer read-out processing unit 172 in accordance with a reception of the frame transmission request from the bandwidth management unit 173.

When receiving the frame transmission request, the frame read-out processing unit 172 searches the queue management table 23 by using the flow ID 412 simultaneously outputted from the bandwidth management unit 173 (S301). The frame read-out processing unit 172 starts transmitting the frame after reading out the frame from the buffer by using the read pointer 2308 (S302), and subtracts, from the storage byte number 2306, the frame length 413, which has been read out from buffer thus read out, so that the storage byte number buffer is overwritten (S303). Thereafter, the update processing of the read pointer is performed (S400), and the updated read pointer 2308 and the storage byte number 2306, etc., are written into the queue management table 23 (S304), and the processing will end (S305).

Figure 12:
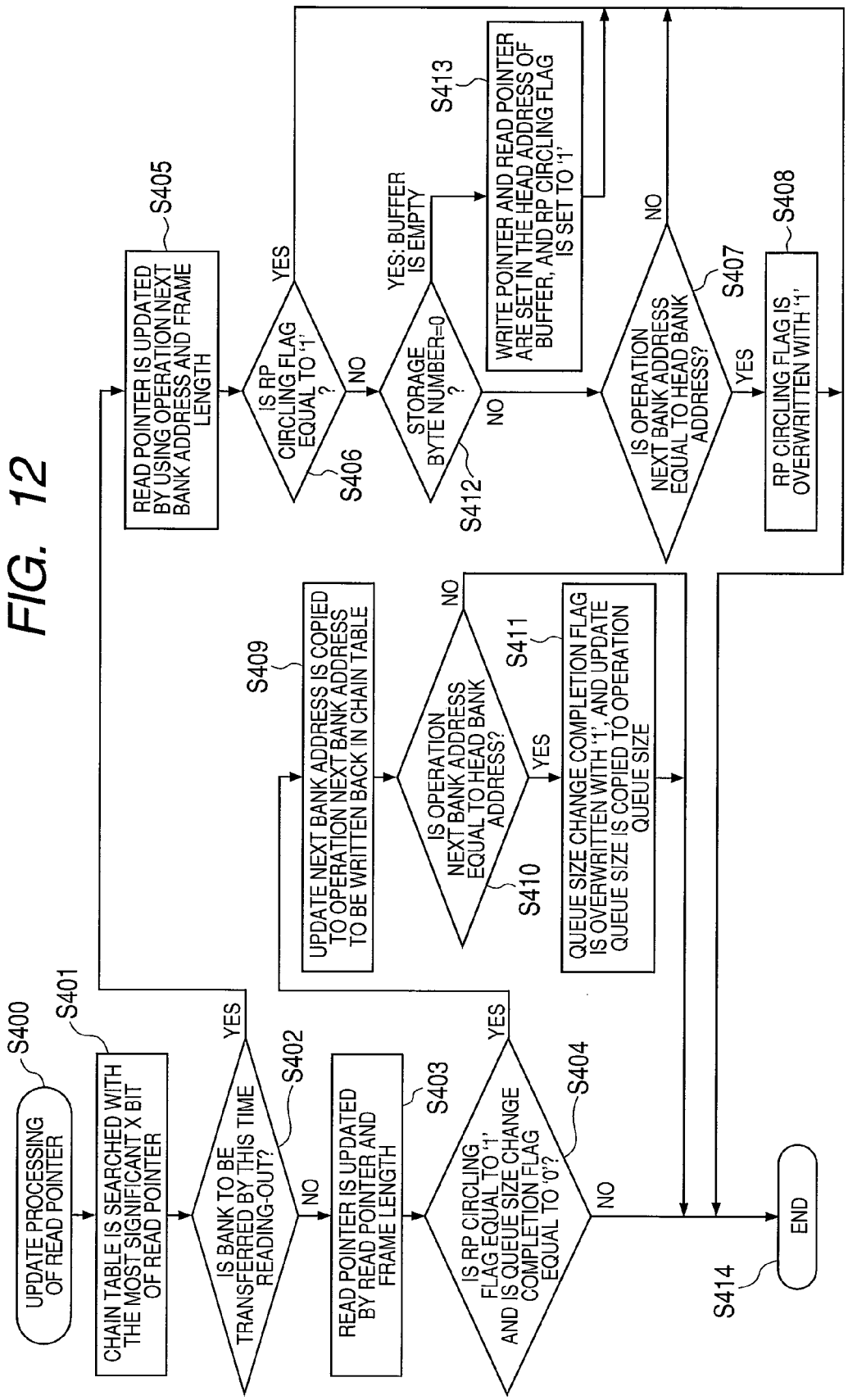
FIG. 12 is a flow chart of update processing of a read pointer, executed by the output frame buffer control unit in FIG. 2.

FIG. 12 illustrates an example of the update processing of the read pointer in FIG. 11 (S400). The chain table 24 is at first searched with the bank address of the most significant X bit of the read pointer 2308 (S401), and then it is determined whether the bank is to be transferred as a result of this time reading-out for the frame length 413 (S402). When the bank is not to be transferred, the frame length 413 is added in the read pointer 2308 to overwrite the read pointer 2308 (S403). Thereafter, it is checked whether the RP go-around flag 2310 is '1' and the queue size change completion flag 2311 is '0' (S404). When the RP go-around flag 2310 is not '1' and the queue size change completion flag 2311 is not '0', the processing will end as it is (S414).

In the S402, when the bank is to be transferred as a result of this time reading-out for the frame length 413, the read pointer 2308 is updated by using the operation next bank address 2402 and the frame length 413 (S405). Then, the RP go-around flag 2310 is checked (S406), and when the RP go-around flag 2310 is '0' (the go-around by the read pointer 2308 is not completed), the updated storage byte number 2306 is checked (S412). When the storage byte number is not '0', the operation next bank address 2402 is compared to the head bank address 2302 (S407). When both are not equal to each other, the processing will end (S414). On the other hand, both are equal to each other, the RP go-around flag 2310 is overwritten with '1' because the first go-around has occurred with the read pointer 2308 (S408), thereafter the processing will end (S414).

On the other hand, in the S412, when the storage byte number 2306 is '0' (buffer is empty), the write pointer 2307 and the read pointer 2308 are set in the head of the head bank address 2302 and the RP go-around flag 2310 is set to '1' (S413), in order to immediately validate the change in the queue size of the present buffer, and then the processing will end (S414). Herein, the reason why the queue size change completion flag is not immediately set to '1' is that the chain information is updated (the update next bank address 2402 is copied to the operation next bank address 2402) while the read pointer 2308 is again go-around the buffer after the read pointer 2308 has circled the buffer once (after the RP go-around flag has been set to '1').

In the S406, when the RP go-around flag 2310 is '1' (the read pointer 2308 has circled once), the processing will end (S414).

In the S404, when the RP go-around flag 2310 is '1' and the queue size change completion flag 2311 is '0', the update next bank address 2403 is copied to the operation next bank address 2402 and written back in the chain table 24 (S409). Thereafter, the operation next bank address 2402 is compared to the head bank address 2302 (S410), and when both are not equal to each other, the processing after the S412 are performed. On the other hand, both are equal to each other, the queue size change completion flag 2311 is overwritten with '1' (the change has been completed) because the second go-around has occurred with the read pointer 2308. Then, the update queue size 2305 is copied to the operation queue size 2304 and the processing will end (S414).

When the queue size during operation is to be changed in the above processing, the NIF management unit 18: at first sets new chain information in the update next bank address 2403 in the chain table 24; thereafter sets a new queue size in the update queue size 2305 in the queue management table 23, and sets, in the A/D 2303, an increase ('0') or a reduction ('1'); and respectively sets '0' in the WP go-around flag 2309, the RP go-around flag 2310, and the queue size change completion flag 2311. Thereby, the output frame buffer control unit 17 recognizes the necessity of the change processing of the queue size because the WP go-around flag 2309, the RP go-around flag 2310, and the queue size change completion flag 2311 are respectively '0', so that the update of the queue size is performed in accordance with the aforementioned flow chart. Herein, it is essential that an increase/reduction in the bank is performed from the tail end of the linked list buffer and further the head bank address 2302 should not be included.

Second Embodiment

Subsequently, a method of managing a linked list buffer will be described as a second embodiment, in which a reduced and opened area is to be invalidated when a queue size has been reduced. The structure of the packet communication apparatus according to the present embodiment is completely the same as that in FIG. 2 of the first embodiment; however, the chain table 24, the queue management table 23, the update processing of the write pointer (S200), and the update processing of the read pointer (S400) are different therefrom in the points described below.

FIG. 19 illustrates, when a queue size has been reduced, a method of opening the frame buffer in the reduced area.

In the linked list buffer according to the present embodiment, when the queue size has been reduced during operation, and when one intends to learn which area of the bank is opened in order to allocate the bank to another flow, it is necessary to manage buffer such that the opened bank should be used. Accordingly, when the queue size of the frame buffer 2000 has been reduced from six banks to four banks as illustrated in FIG. 19, it is needed that the opened area (banks #5 and #6) is invalidated.

FIG. 16 illustrates the chain table 24 to which the field of an in-use flag 2404 has been added in order to open the buffer as stated above.

The in-use flag 2404 is one indicating whether the bank, corresponding to the relevant entry, is being used, in which, when the in-use flag is '1', it is indicated that the relevant bank is being used; on the other hand, when the in-use flag is '0', it is indicated that the relevant bank is opened.

FIG. 15 illustrates the queue management table 23 provided with fields for a WP go-around counter 2312, an RP go-around counter 2313, and an invalidation flag 2314, in order to open the buffer as stated above.

In order to realize the opening of the buffer, stated above, it is required that not only the chain information is updated with the fact that each of the write pointer 2307 and the read pointer 2303 is not present in the bank to be reduced after detecting that the write pointer 2307 and the read pointer 2308 have gone around once, being a trigger, but also the in-use flag 2404 in the reduced bank area is set from '0' to '1' by making the write pointer 2307 and the read pointer 2303 circle once more, so that the bank is opened. Accordingly, the queue management table 23 includes the WP go-around counter 2312 and the RP go-around counter 2323, for respectively counting the number of the go-around by the write pointer 2307 and the read pointer 2308 instead of the WP go-around flag 2309 and the RP go-around flag 2310. Further, as illustrated in FIG. 19, the bank area to be opened ranges from the middle of the buffer to the tail end thereof, and hence the invalidation flag 2314 is needed as the information indicating that the opening processing of the buffer is started during the second go-around.

Figure 17:
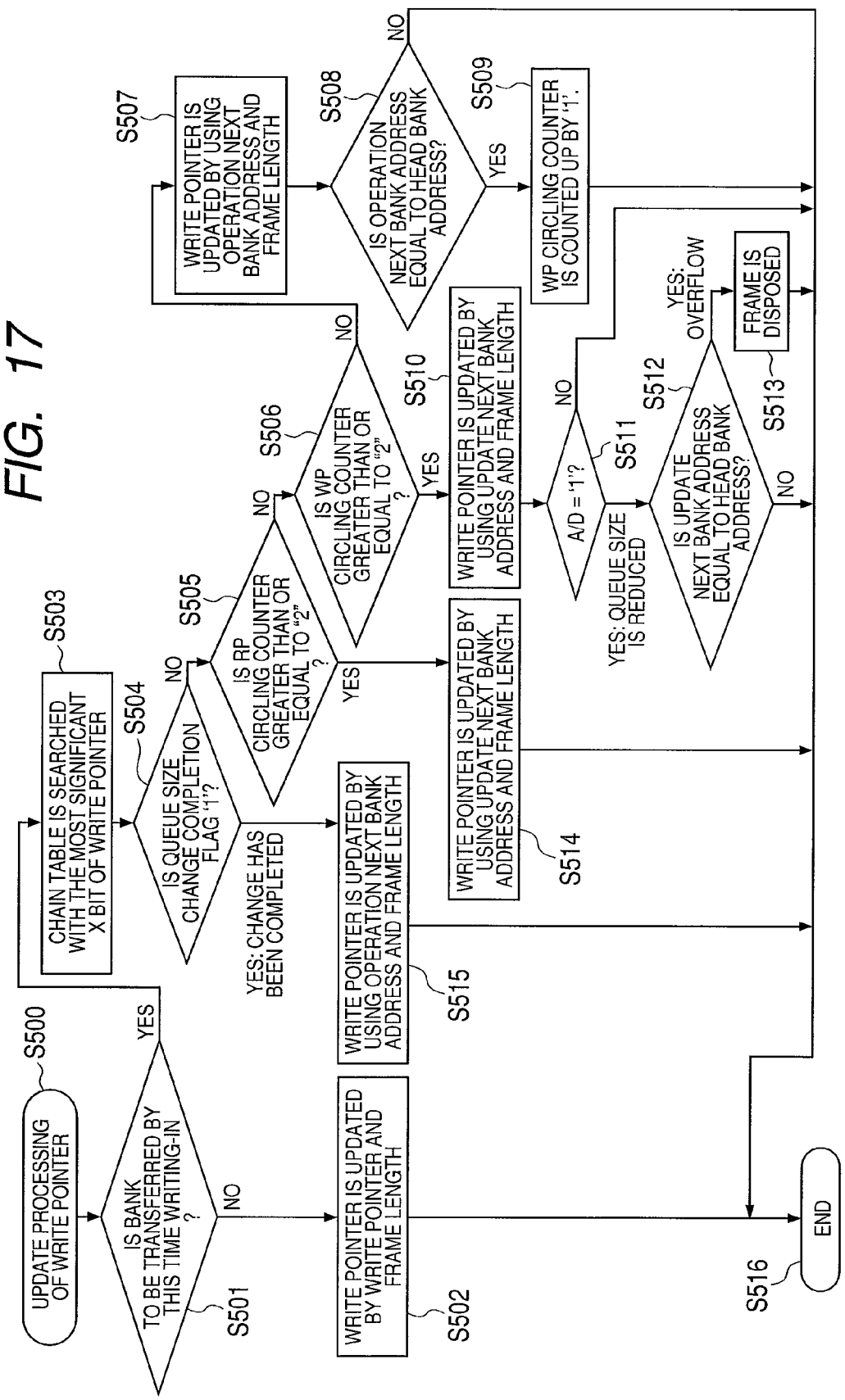
FIG. 17 is a flow chart of update processing of the write pointer, executed by the output frame buffer control unit in FIG. 2, according to the second embodiment.

FIG. 17 illustrates the content of the update processing of the write pointer (S500) to which the opening processing of the buffer is added, executed by the buffer write-in processing unit 171 instead of the update processing of the write pointer (S200) in FIGS. 9 and 10.

In the update processing of the write pointer (S500), illustrated in FIG. 17, it is at first determined whether the bank is to be transferred as a result of this time writing-in for the frame length 413 (S501). When the bank is not to be transferred, the frame length 413 is added in the write pointer 2307 (S502) and the processing will end (S516). On the other hand, when the bank is to be transferred as a result of the aforementioned determination, the chain table 24 in FIG. 16 is searched with the most significant X bit of the write pointer 2307 (S503).

After searching the aforementioned chain table 24 and acquiring the chain information, the queue size change completion flag 2311, which has been acquired from the queue management table 23 in FIG. 15, is checked (S504). When the queue size change completion flag 2311 is '0' (the change is not completed), the RP go-around counter 2313 is checked (S505), and when the RP go-around counter 2313 is less than "2", the WP go-around counter 2312 is checked (S506). When the WP go-around counter 2312 is less than "2", the write pointer 2307 is updated by using the operation next bank address 2402 and the frame length 413 (S507), and then the operation next bank address 2402 is compared to the head bank address 2302, which has been acquired from the queue management table 23 (S508). When both are not equal to each other, the processing will end as it is (S516). On the other hand, both are equal to each other in the S508, the WP go-around counter 2312 is counted up by '1' (S509) and the processing will end (S516).

In the aforementioned S506, when the WP go-around counter 2312 is greater than or equal to "2", the write pointer 2407 is updated by using the update next bank address 2403 and the frame length 413 (S510). Thereafter, the A/D 2303 is checked, and when the A/D 2303 is '0' (increase in the queue size), the processing will end (S516). On the other hand, when the A/D 2303 is '1' (reduction in the queue size), the update next bank address 2403 is compared to the head bank address 2302, which has been acquired from the queue management table 23 (S512). When both are equal to each other, the frame is disposed as an overflow (S513), and the processing will end (S516). On the other hand, both are equal to each other in the S512, the processing will end as it is (S516).

In the aforementioned 5505, when the RP go-around counter 2313 is greater than or equal to "2", the write pointer 2407 is updated by using the update next bank address 2403 and the frame length 413 (S514), and the processing will end (S516).

In the aforementioned 5504, when the queue size change completion flag 2311 is '1' (the change has been completed), the write pointer 2407 is updated by using the operation next bank address 2402 and the frame length 413 (S515), and the processing will end (S516).

Figure 18:
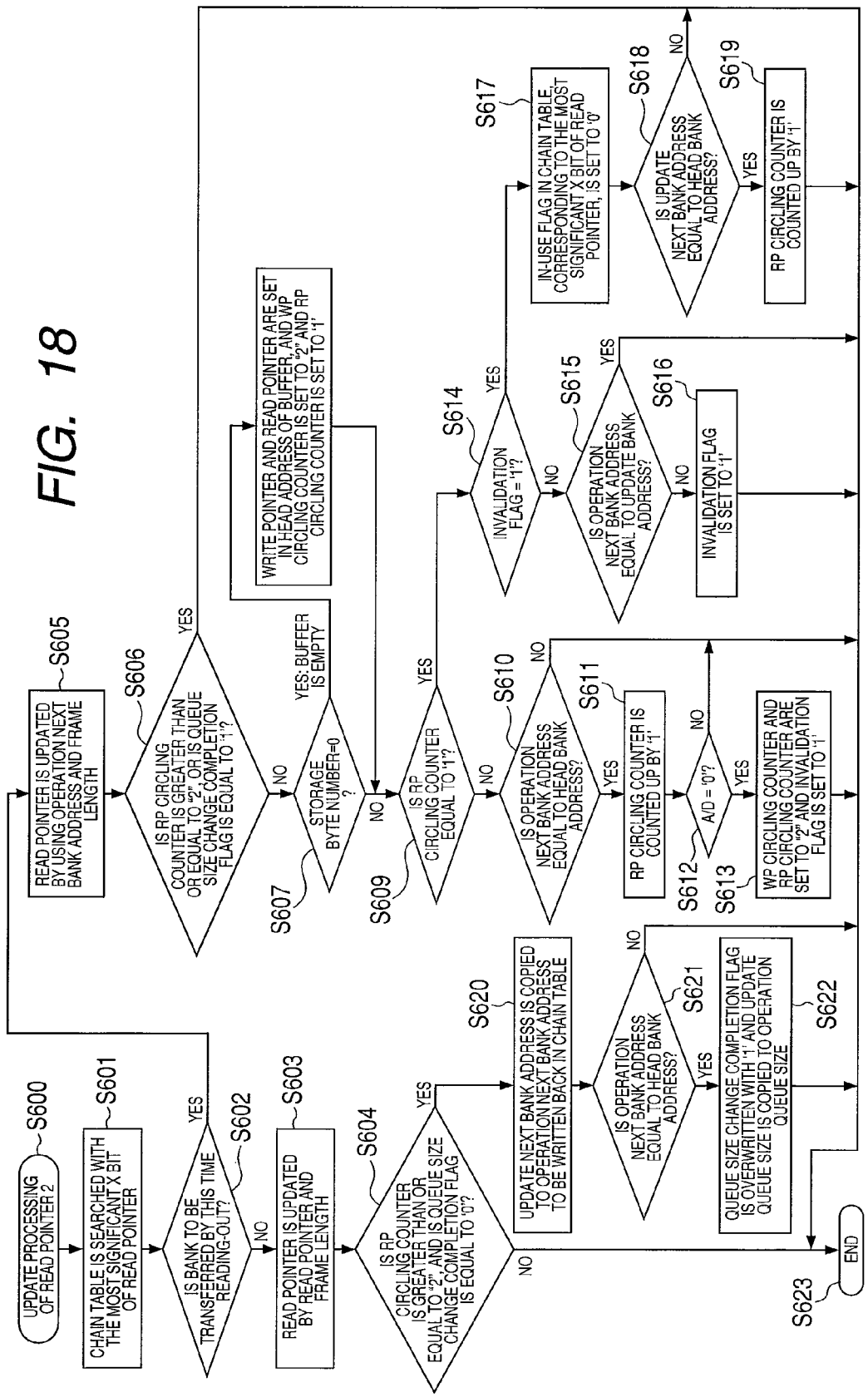
FIG. 18 is a flow chart of update processing of the read pointer, executed by the output frame buffer control unit in FIG. 2, according to the second embodiment.

FIG. 18 illustrates the content of the update processing of the read pointer (S600) to which the opening processing of the buffer is added, executed by the buffer read-out processing unit 172 instead of the update processing of the read pointer (S400) illustrated in FIGS. 11 and 12.

In the update processing of the read pointer (S600) illustrated in FIG. 18, the chain table 24 in FIG. 16 is searched with the bank address of the most significant X bit of the read pointer 2308 (S601), and it is determined whether the bank is to be transferred as a result of this time reading-out for the frame length 413 (S602). When the bank is not to be transferred, the frame length 413 is added in the read pointer 2308 to overwrite the read pointer 2308 (S603). It is checked whether the RP go-around counter 2313 is greater than or equal to "2" and whether the queue size change completion flag 2311 is '0' (S604), and when the RP go-around counter 2313 is not greater than or equal to "2" and when the queue size change completion flag 2311 is not '0', the processing will end as it is (S623).

In the S602, when the bank is to be transferred as a result of this time reading-out for the time frame length 413, the read pointer 2308 is updated by using the operation next bank address 2402 and the frame length 413 (S605), and it is checked whether the RP go-around counter 2313 is greater than or equal to "2" or whether the queue size change completion flag 2311 is '1'(S606). When the RP go-around counter 2313 is greater than or equal to "2" or when the queue size change completion flag 2311 is not '1', the aforementioned updated storage byte number 2306 is checked (S607), and when the storage byte number 2306 is '0' (buffer is empty), the write pointer 2307 and the read pointer 2308 are set in the head of the head bank address 2302, and the WP go-around counter 2312 and the RP go-around counter 2313 are respectively set to "2" and '1' (S608), in order to immediately validate the change in the queue size of the present buffer. Herein, the reason why the queue size change completion flag is not immediately set to '1' and the RP go-around flag is not immediately set to "2" is that the in-use flag 2404 in the chain table 24 is set to '0' while the read pointer 2308 is again go-around the buffer after the read pointer 308 has circled the buffer once (after the RP go-around counter has been set to '1'), so that the buffer is opened, and that the chain information is updated (the update next bank address 2403 is copied to the operation next bank address 2402) while the read pointer 2308 is go-around the buffer once again (during the second go-around to the third go-around).

When the storage byte number 2306 is not '0' after the aforementioned processing or in the aforementioned S607, the RP go-around counter 2313 is checked (S609). When the RP go-around counter 2313 is '0', the operation next bank address 2402 is compared to the head bank address 2302 (S610). When both are not equal to each other, the processing will end (S623). On the other hand, when both are equal to each other, the RP go-around counter 2308 is counted up by '1' because the first go-around occurs with the read pointer 2308 (S611). Thereafter, the A/D 2303 is checked (S612), and when the A/D 2303 is '0' (reduction in the queue size), the processing will end as it is (S623). On the other hand, when the A/D 2303 is '1' (increase in the queue size), the WP go-around counter 2312 and the RP go-around counter 2313 are respectively set to "2", and the invalidation flag 2314 is set to '1', and the processing will end (S623). This is because it is not necessary to perform the opening processing of the buffer when the queue size is increased. However, because it is necessary to perform the update processing of the chain information, the queue size change completion flag 2311 is not set to '1'.

In the S609, when the RP go-around counter 2313 is '1', (the read pointer 2308 has circled the buffer once), the invalidation flag 2314 is checked (S614), and when the invalidation flag 2314 is '0', the operation next bank address 2402 is compared to the update next bank address 2403 (S615). When both are equal to each other, the processing will end (S623). On the other hand, when both are not equal to each other, the invalidation flag 2314 is set to '1' in order to start the opening processing of the buffer, and the processing will end (S623).

In the S614, when the invalidation flag is '1', the opening processing of the buffer is currently underway. Accordingly, the in-use flag 2404 in the chain table 24 in FIG. 16, corresponding to the bank address of the most significant X bit of the read pointer 2308, is set to '0' (is opened) (S617), and the update next bank address 2403 is compared to the head bank address 2302 (S618). When both are not equal to each other, the processing will end (S623). On the other hand, when both are equal to each other, the RP go-around counter is counted up by '1' because the second go-around has occurred with the read pointer 2308 (S619), thereafter the processing will end (S623).

In the aforementioned 5606, when the RP go-around counter 2313 is greater than or equal to "2" or when the queue size change completion flag 2311 is '1', the processing will end as it is (S623).

In the S604, when the RP go-around counter 2313 is greater than or equal to "2" and the queue size change completion flag 2311 is '0', the update next bank address 2403 is copied to the operation next bank address 2402 and written back in the chain table 24 (S620). Thereafter, the operation next bank address 2402 is compared to the head bank address 2302 (S621). When both are not equal to each other, the processing will end (S623). On the other hand, when both are equal to each other, the queue size change completion flag 2311 is overwritten with '1' (change has been completed) because the third go-around has occurred with the read pointer 2308. Then, the update queue size 2305 is copied to the operation queue size 2304 (S622), and the processing will end (S623).

Herein, when one intends to change the queue size during operation, the NIF management unit 18 at first sets new chain information in the update next bank address 2403 in the chain table 24. Then, the NIF management unit 18 sets a new queue size in the update queue size 2305 in the queue management table 23, and sets an increase ('0') or a reduction ('1') in the A/D 2303, and respectively sets '0' in the WP go-around counter 2312, the RP go-around counter 2313, the invalidation flag 2314, and the queue size change completion flag 2311. Thereby, the output frame buffer control unit 17 recognizes the necessity of the change processing of the queue size because the WP go-around counter 2312, the RP go-around counter 2313, the invalidation flag 2314, and the queue size change completion flag 2311 are respectively '0', so that the queue size is updated in accordance with the aforementioned flow chart. Herein, it is essential that an increase/reduction in the bank is performed from the tail end of the linked list buffer and further the head bank address 2302 should not be included.

INDUSTRIAL APPLICABILITY

The present invention relates to a packet communication system, and in particular, is useful as a packet communication apparatus in an access apparatus installed in a user's base, in which redundancy of the control pathway can be possible when remote control is performed.

What is claimed is:
1. A buffer management method in a packet communication apparatus having a linked list buffer,
wherein the packet communication apparatus holds chain information and buffer size information, for structuring a linked list buffer for each user flow, in two areas consisting of an operation area and an update area, wherein the packet communication apparatus holds go-around information indicating that a write pointer and a read pointer, for reading/writing in the linked list buffer, have gone around the linked list buffer, wherein, while usually in service, the linked list buffer is structured by using the chain information in the operation area and the buffer size information in the same area such that a frame for the user flow is read/written in the linked list buffer, and wherein, when the chain information in the update area and the buffer size information in the same area have been changed, a queue size is changed by reflecting the changed chain information in the update area and the changed buffer size information in the same area into the operation area, when the go-around information indicates that the read pointer and the write pointer respectively have gone around the linked list buffer.

2. The buffer management method according to claim 1, wherein the packet communication apparatus updates the queue size by reflecting the changed chain information in the update area and the changed buffer size information in the same area into the operation area, when there is no frame stored in the linked list buffer.

3. The buffer management method according to claim 1, wherein, when the chain information in the update area and the buffer size information in the same area have been changed, the packet communication apparatus performs update processing of the chain information or invalidation processing of an eliminated buffer area in the liked list buffer based on the number of the go-around indicated by the go-around information.

4. The buffer management method according to claim 1, wherein, when the queue size is reduced in the update processing, the packet communication apparatus uses the changed chain information in determining overflow of the buffer before the queue size has been updated.

5. The buffer management method according to claim 3, wherein the packet communication apparatus holds an in-use flag indicating that the linked list buffer is being used, and changes the in-use flag corresponding to the invalidated buffer area.

6. A packet communication apparatus that has a buffer of a linked list method and structures a linked list buffer for a user flow to process the user flow, the packet communication apparatus comprising:

a processing unit;
a storage unit;
and an interface unit,
wherein the storage unit holds an operation area and an update area that respectively hold chain information and buffer size information, for structuring a linked list buffer for each of the user flows from the interface unit, and holds an area for holding go-around information indicating that the linked list buffer has been circled as a result of reading/writing in the linked list buffer, wherein, while usually in service, the processing unit structures the linked list buffer by using the chain information in the operation area and the buffer size information in the same area such that a frame for the user flow is read/written in the linked list buffer, and wherein, when the chain information in the update area and the buffer size information in the same area have been changed, the changed chain information in the update area and the changed buffer size information in the same area are written in the operation area, when a read pointer and a write pointer respectively have gone around the linked list buffer.

7. The packet communication apparatus according to claim 6, wherein the processing unit writes, in the operation area, the changed chain information in the update area and the changed buffer size information in the same area when there is no frame for the user, stored in the linked list buffer.

8. The packet communication apparatus according to claim 6, wherein the go-around information indicates the number of the read/write go-around of the linked list buffer, and wherein, when the chain information in the update area and the buffer size information in the same area have been changed, the processing unit performs update processing of the chain information or invalidation processing of an eliminated buffer area in the liked list buffer, based on the number of the go-around.

9. The packet communication apparatus according to claim 6, wherein, when a queue size has been reduced by writing, in the operation area, the changed chain information in the update, area and the updated buffer size information in the same area, the processing unit uses the changed chain information in determining overflow of the buffer before the queue size has been reduced.

10. The packet communication apparatus according to claim 8, wherein the processing unit holds a flag indicating that the linked list buffer is being used, and controls so as to change the flag corresponding to the invalidated buffer area.

11. A packet communication apparatus comprising:

an output frame buffer control unit that sequentially writes/reads frames for each user flow in/from an output frame buffer; and a storage unit, wherein, the storage unit stores a chain table for holding operation chain information and update chain information in order to structure a linked list buffer for each user flow in the output frame buffer, and stores a queue management table for holding operation buffer size information and update buffer size information, and holding go-around information indicating that a write pointer and a read pointer, for reading/writing the linked list buffer, have gone around the linked list buffer, wherein, while usually in service, the output frame buffer control unit reads/writes the frames for user flows in the linked list buffer by structuring the linked list buffer by using the operation chain information and the operation buffer size information, and wherein, when the update chain information and the update buffer size information have been changed, the output frame buffer control unit changes, based on the go-around information, a queue size by making the update chain information and the update buffer size information respectively be the operation chain information and the operation buffer size information, when the write pointer and the read pointer respectively have gone around the linked list buffer.

12. The packet communication apparatus according to claim 11, wherein, when there is no frame for user flows stored in the linked list buffer, the output frame buffer control unit changes the queue size by making the chain information in the operation area and the buffer size information in the same area respectively be the operation chain information and the operation buffer size information.

13. The packet communication apparatus according to claim 11, wherein the go-around information indicates the number of the go-around by the write pointer and the read pointer, and wherein, when the update chain information and the update buffer size information have been changed, the output frame buffer control unit performs update processing of the operation chain information and the operation buffer size information, or performs invalidation processing of an eliminated buffer area in the liked list buffer, based on the number of the go-around.

14. The packet communication apparatus according to claim 11, wherein, when the queue size has been reduced, the output frame buffer control unit uses the updated update chain information in determining overflow of the buffer before the queue size has been changed.

15. The packet communication apparatus according to claim 13, wherein the chain table stored in the storage unit holds an in-use flag indicating whether the buffer area in the linked list buffer is being used, and the output frame buffer control unit controls so as to change the in-use flag corresponding to the invalidated buffer area.

* * * * *